Oct. 11, 1955    J. C. LAYTON    2,720,122
ROTATION CONTROL UNIT
Filed Jan. 2, 1953
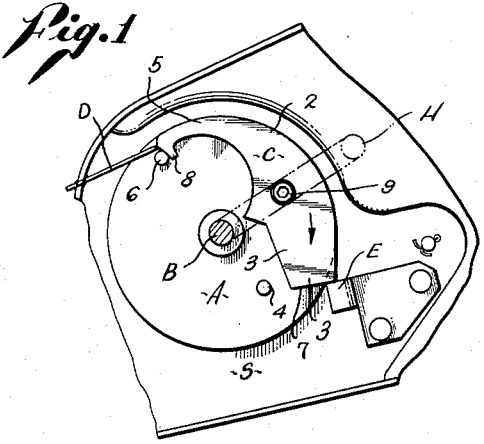
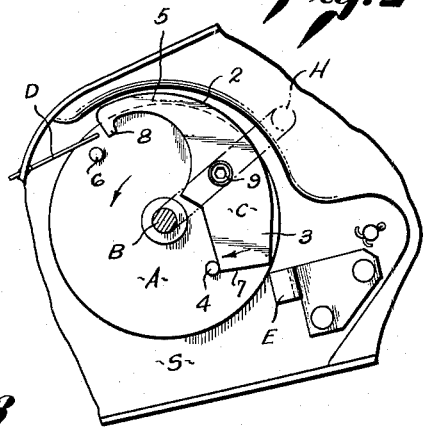
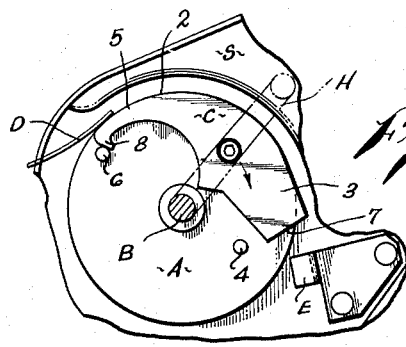
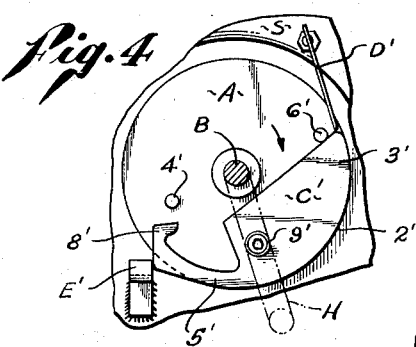
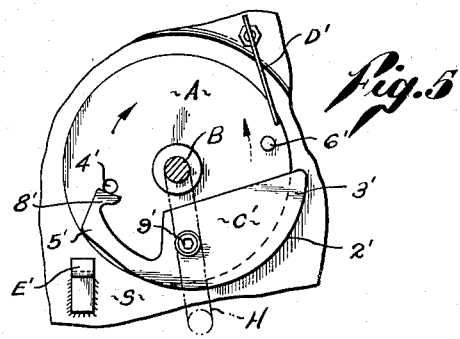
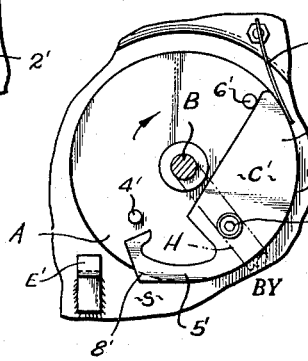
INVENTOR.
J. C. LAYTON
BY
Luther L. Mack
Attorney

United States Patent Office 2,720,122
Patented Oct. 11, 1955

2,720,122

ROTATION CONTROL UNIT

J. C. Layton, Montebello, Calif., assignor to Towlsaver, Inc., Los Angeles, Calif., a corporation of California Application January 2, 1953, Serial No. 329,397

10 Claims. (Cl. 74—565)

This invention relates to and has for an object the provision of an improved and simple unit adapted for application to various types of mechanisms for effecting forward rotation of a member to a predetermined extent measured in complete or fractional revolutions and incapable of exceeding a predetermined movement without first retracting the operated member for effecting its release preparatory to a succeeding cycle.

Reference is had, in the consideration of this invention, to an application for patent filed jointly by J. C. Layton and Ralph Shaffer, for a rotation control unit, filed October 18, 1952, Serial No. 315,472, for a similar purpose, but which provides for the shifting of a weighty element between two extreme positions on a rotating member for overbalancing and thereby stopping and releasing the control means. In said prior structure a heavy fluid such as mercury is employed which, when it flows through a restricted orifice from one chamber to another disposed on opposite sides of the axis of a container, serves to lock the rotating support against further forward rotation until the rotating member is turned reversely for a fraction of a revolution and the weighty element is transferred to a point on the opposite side of the axis of the rotating member, thereby permitting further forward rotation to the extent of a succeeding cycle.

I have ascertained by experimentation that said previous structure can be simplified to fulfill most usual demands without employment of mercury or other shiftable weighty elements, and in lieu thereof have sought, and it is an object hereof, to provide a simple unit having parts so designed, contoured and arranged that production cost and maintenance will be minimized without impairing or reducing dependability of operation, and opportunities for use on various types of mechanisms substantially increased.

Specifically, it is an object to provide a rotatable member such as a circular disc affixed to a power or manually driven shaft, a rockable unit pivotally supported on said disc at a point outwardly of the axis of the disc, stops on the discs for limiting oscillation of the rocker in opposite directions, and means stationarily mounted outwardly of the disc for engagement at times with substantially diametrically opposite surfaces of the rocker to appropriately effect stoppage and release of the rotatable disc at the completion of predetermined forward and reverse movement of the disc, respectively.

Other objects may appear as the description progresses.

There is shown in the accompanying drawing two preferred forms of units for the purpose of the invention, subject to modification, within the scope of the appended claims, without departing from the spirit of the invention.

In said drawing:

Fig. 1 is a face view of one form of a unit shown in locked position against forward movement as at the completion of an operational cycle;

Fig. 2 is a similar view of the unit immediately following a slight reverse movement of the disc with the rocker retracted from possibility of engagement with a fixed stop and preparatory to the start of a succeeding operational cycle;

Fig. 3 is a similar view with the rocker shown approaching the end of a cycle and disposed in readiness for engaging the stop; and Figs. 4, 5 and 6 are similar views of a modified form and arrangement of parts of the unit in positions corresponding respectively to Figs. 1, 2 and 3.

In both forms of unit the parts correspond except in some cases as to contour, location and disposition. In both forms a rotatable circular disc A is employed and is affixed to and adapted to be driven by a shaft B, and similar rockable members C and C' [hereinafter referred to as rockers] are employed, but it will be noted that rockers C' of Figs. 4, 5 and 6 are of different contour and disposition than rockers C of Figs. 1, 2 and 3, for reasons to be hereinafter explained. Rockers C and C' are pivotally held on discs A by pins 9 and 9' respectively.

Flat springs D in Figs. 1, 2 and 3 are anchored to a support S and similar but differently located springs D' are shown in Figs. 4, 5 and 6. In both cases said springs are arranged to overlie concentric surfaces 2 of rockers C and 2' of rockers C' for at times during rotation of rockers C or C' with disc A urging the weighted portion 3 of rocker C against a stop pin 4 on disc A as the disc is rotated in a forward direction and at a subsequent time in each revolution urging the lighter tail section 5 against a second stop 6 on disc A, in the operation of the form of Figs. 1, 2 and 3.

A fixed stop E is provided on support S at a point about diametrically of and near the periphery of disc A but in the path of rocker C when portion 3 of the rocker is extended beyond the periphery of the disc by pressure of spring D on the tail 5 as shown in Fig. 3, thereby stopping rotation of the disc and rocker until the end 7 of the rocker is retracted from stop E to the position shown in Fig. 2. When the disc is reversely rotated to a slight extent the end 3 of rocker C will engage the pin 4 and thus limit movement of the rocker and at the same time move portion 3 inwardly and out of contact with stop E in readiness for another forward revolution.

Thus, pins 4 and 6 limit the inward swing of rocker C at opposite extremities in locking and unlocking movements.

Referring to Figs. 4, 5 and 6, it will be noted that the fixed stop E', spring D' and the rocker C' are of slightly different form and are differently positioned from the corresponding parts E, D and C of the form of Figs. 1, 2 and 3. For example, the portion 5' of the rocker C' is in leading position in this form and is in trailing position in the first described form of the unit.

Hence, the end 8' of rocker C' is engageable with stop E' to stop rotation of disc A. The swing of rocker C' on its axis 9' is limited by pins 4' and 6', and is stopped by engagement by portions 8' and 3' respectively as shown in Fig. 4 and spring D' urges portions 3' and 5' of rocker C' into successive engagement with said pins in each revolution of disc A. Otherwise the operation of the two types of units is the same.

An operating handle H as shown or gear connections between the handle or other source of power and driven shaft B may be provided as found to be convenient or desirable.

In operation, the parts are normally in the starting position shown in Figs. 1 and 4, and a new cycle is instituted by slightly reversely rotating disc A to an extent sufficient to disengage and retract rockers C or C' from stops E or E', as the case may be. As forward motion ensues the springs D or D' extend portions 3 or 8' outwardly into the path of stops E or E' and a cycle is completed.

I claim:

1. A rotation control unit comprising: a rotatable member, a support therefor, a rockable member rotatable with and oscillatably supported on said rotatable member, a fixed stop on said support adjacent the orbit of said rockable member adapted to be engaged by an extremity of said rockable member, stop means borne by the rotatable member for limiting the oscillation of the rockable member, means for holding said rockable member in position to engage with said fixed stop, a slight reverse rotation of said rotatable member being effective for releasing said rockable member for an ensuing forward revolution of said rotatable member.

2. A rotation control unit comprising: a rotatable member, a support therefor, a rockable member rotatable with and oscillatably supported on said rotatable member, a fixed stop on said support adjacent the orbit of said rockable member adapted to be engaged by an extremity of said rockable member, stop means borne by the rotatable member for limiting the oscillation of the rockable member, means for holding said rockable member in position to engage with said fixed stop, a slight reverse rotation of said rotatable member being effective for releasing said rockable member for an ensuing forward revolution of said rotatable member, said stop means serving also as a stop to prevent inward swing of said rockable member beyond a predetermined position on the rotatable member.

3. A rotation control unit comprising: a rotatable disc, a support therefor, means for rotating said disc, a rocker pivotally supported on said disc at a point spaced from the axis of the disc so that an extremity of the rocker will extend beyond the periphery of the disc, a pair of stops borne by said disc and engageable with said rocker at points on opposite sides of the rocker axis to limit the swing of the rocker in opposite directions, a spring bearing against said rocker for swinging said rocker in a given direction at the same point in each revolution, and a fixed stop on said support disposed in the orbit of a portion of the rocker when it is extended from a normally retracted position during rotation of said disc to a position of engagement with said fixed stop and so held until released to start a succeeding operational cycle.

4. A rotation control unit comprising: a rotatable disc, a support therefor, means for rotating said disc, a rocker pivotally supported on said disc at a point spaced from the axis of the disc so that an extremity of the rocker will extend beyond the periphery of the disc, a pair of stops borne by said disc and engageable with said rocker at points on opposite sides of the rocker axis to limit the swing of the rocker in opposite directions, a spring bearing against said rocker for swinging said rocker in a given direction at the same point in each revolution, and a fixed stop on said support disposed in the orbit of a portion of the rocker when it is extended from a normally retracted position during rotation of said disc to a position of engagement with said fixed stop and so held until released to start a succeeding operational cycle, said rocker being heavier on one side of its axis than on the other side, whereby upon reverse rotation of the disc to disengage the rocker from said fixed stop, the heavy side of the rocker will overbalance the rocker and release it from said fixed stop.

5. A rotation control unit comprising: a rotatable disc, a support therefor, means for rotating said disc, a rocker pivotally supported on said disc at a point spaced from the axis of the disc so that an extremity of the rocker will extend beyond the periphery of the disc, a pair of stops borne by said disc and engageable with said rocker at points on opposite sides of the rocker axis to limit the swing of the rocker in opposite directions, a spring bearing against said rocker for swinging said rocker in a given direction at the same point in each revolution, and a fixed stop on said support disposed in the orbit of a portion of the rocker when it is extended from a normally retracted position during rotation of said disc to a position of engagement with said fixed stop and so held until released to start a succeeding operational cycle, said rocker being heavier on one side of its axis than on the other side, whereby upon reverse rotation of the disc to disengage the rocker from said fixed stop, the heavy side of the rocker will overbalance the rocker and release it from said fixed stop, the heavy side of said rocker tending to swing the rocker on its axis by force of gravity at a given point in each revolution of the disc for releasing the rocker from the fixed stop.

6. A rotation control unit comprising: a rotatable member, a support therefor, means for rotating said member, a rocker oscillatably supported on and adapted for rotation with the rotatable member, means on the rotatable member for limiting the swing of the rocker from a position wholly within the periphery of the rotatable member to a position whereat said rocker will be partly extended from the rotatable member, and a fixed stop device on said support in the path of the extended portion of said rocker, for arresting rotation of the rotatable member at a given point in each revolution, said rocker being releasable from said stop only upon a slight reverse rotation of the rotatable member preparatory to a succeeding operational cycle.

7. A rotation control unit comprising: a rotatable member, a support therefor, means for rotating said member, a rocker oscillatably supported on and adapted for rotation with the rotatable member, means on the rotatable member for limiting the swing of the rocker from a position wholly within the periphery of the rotatable member to a position whereat said rocker will be partly extended from the rotatable member, and a fixed stop device on said support in the path of the extended portion of said rocker, for arresting rotation of the rotatable member at a given point in each revolution, said rocker being releasable from said stop only upon a slight reverse rotation of the rotatable member preparatory to a succeeding operational cycle, and means on said support engageable with and for extending the rocker to a position for reengagement with said stop before completion of a revolution of the rotatable member following release of said rocker.

8. A rotation control unit comprising: a rotatable member, a support therefor, means for rotating said member, a rocker oscillatably supported on and adapted for rotation with the rotatable member, means on the rotatable member for limiting the swing of the rocker from a position wholly within the periphery of the rotatable member to a position whereat said rocker will be partly extended from the rotatable member, and a fixed stop device on said support in the path of the extended portion of said rocker, for arresting rotation of the rotatable member at a given point in each revolution, said rocker being releasable from said stop only upon a slight reverse rotation of the rotatable member preparatory to a succeeding operational cycle, and means on said support engageable with and for extending the rocker to a position for reengagement with said stop before completion of a revolution of the rotatable member following release of said rocker, said rocker extending means including a spring anchored to said support and at times bearing against said rocker to extend a portion of the rocker for engagement with said stop and at other times retracting another portion of said rocker.

9. A rotation control unit comprising: a rotatable member, a support therefor, means for rotating said member, a rocker oscillatably supported on and adapted for rotation with the rotatable member, means on the rotatable member for limiting the swing of the rocker from a position wholly within the periphery of the rotatable member to a position whereat said rocker will be partly extended from the rotatable member, and a fixed stop device on said support in the path of the extended portion of said rocker, for arresting rotation of the rotatable member at a given point in each revolution, said rocker being releasable from said stop only upon a slight reverse rotation of the rotatable member preparatory to a succeeding operational cycle, the limiting means for said rocker including elements borne by the rotatable member for engaging different portions of the rocker so as to limit the outward swing of said rocker portions at different points in each revolution of the rotatable member as one of said portions is extended and the other portion is retracted.

10. A rotation control unit comprising: a rotatable member, a support therefor, means for rotating said member, a rocker oscillatably supported on and adapted for rotation with the rotatable member, means on the rotatable member for limiting the swing of the rocker from a position wholly within the periphery of the rotatable member to a position whereat said rocker will be partly extended from the rotatable member, and a fixed stop device on said support in the path of the extended portion of said rocker, for arresting rotation of the rotatable member at a given point in each revolution, said rocker being releasable from said stop only upon a slight reverse rotation of the rotatable member preparatory to a succeeding operational cycle, said rocker having arms oppositely extended from its axis, one of which arms is heavier than the other whereby the heavier arm tends to overbalance the rocker at certain points in the orbit of the rocker to facilitate release of the unit from said stop.

References Cited in the file of this patent

UNITED STATES PATENTS

| | | |
|---|---|---|
| 867,168 | Stull | Sept. 24, 1907 |
| 2,301,678 | Brongersma | Nov. 10, 1942 |